US011374790B2

United States Patent
Rayavarapu et al.

(10) Patent No.: US 11,374,790 B2
(45) Date of Patent: Jun. 28, 2022

(54) APPARATUS, SYSTEM, AND METHOD FOR INCREASING BANDWIDTH UTILIZATION IN ENCAPSULATION TUNNELS

(71) Applicant: Juniper Networks, Inc., Sunnyvale, CA (US)

(72) Inventors: Mani Kanta Kanaka Rayavarapu, Sunnyvale, CA (US); Sairam Neelam, Sunnyvale, CA (US); Shiva Kumar Yenigalla, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 16/917,143

(22) Filed: Jun. 30, 2020

(65) Prior Publication Data
US 2021/0359878 A1 Nov. 18, 2021

(51) Int. Cl.
*H04L 12/46* (2006.01)
*H04L 47/36* (2022.01)

(52) U.S. Cl.
CPC .......... *H04L 12/4633* (2013.01); *H04L 47/36* (2013.01); *H04L 2212/00* (2013.01)

(58) Field of Classification Search
CPC .. H04L 47/36; H04L 12/4633; H04L 2212/00
See application file for complete search history.

(56) References Cited

U.S. PATENT DOCUMENTS

| | | | | | |
|---|---|---|---|---|---|
| 6,618,397 | B1 * | 9/2003 | Huang | .................... | H04L 29/06 370/392 |
| 7,305,464 | B2 * | 12/2007 | Phillipi | .................... | H04L 29/06 709/223 |
| 2003/0005144 | A1 * | 1/2003 | Engel | ..................... | H04L 47/21 709/235 |
| 2004/0184450 | A1 * | 9/2004 | Omran | .................. | H04J 3/1617 370/372 |
| 2014/0122743 | A1 * | 5/2014 | Di Benedetto | ......... | H04L 69/22 709/250 |
| 2017/0163607 | A1 * | 6/2017 | Skuratovich | .......... | H04L 9/0819 |
| 2019/0007915 | A1 * | 1/2019 | Xiang | ..................... | H04L 47/36 |

* cited by examiner

*Primary Examiner* — Azizul Choudhury
(74) *Attorney, Agent, or Firm* — FisherBroyles, LLP

(57) ABSTRACT

A disclosed method may include (1) identifying a packet that enters a start point of an encapsulation tunnel that spans at least a portion of a network, (2) discovering a maximum transmission unit of the encapsulation tunnel, (3) determining whether a size of the packet satisfies a size threshold that is based at least in part on the maximum transmission unit of the encapsulation tunnel, (4) detecting an encapsulation-triggering event in connection with the packet, and then in response to detecting the encapsulation-triggering event, (5) forwarding the packet via the start point of the encapsulation tunnel toward an end point of the encapsulation tunnel. Various other systems, methods, and computer-readable media are also disclosed.

19 Claims, 7 Drawing Sheets

Tunneling Header
500

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|C|G|K|S| Reserved0       | Ver |        Protocol Type          |
+-+-+-+-+-+-+-+-+-+-+-+-+-+-+-+-+-+-+-+-+-+-+-+-+-+-+-+-+-+-+-+-+
|      Checksum (optional)        |      Reserved1 (Optional)    |
+-+-+-+-+-+-+-+-+-+-+-+-+-+-+-+-+-+-+-+-+-+-+-+-+-+-+-+-+-+-+-+-+
|                         Key (optional)                         |
+-+-+-+-+-+-+-+-+-+-+-+-+-+-+-+-+-+-+-+-+-+-+-+-+-+-+-+-+-+-+-+-+
|                    Sequence Number (Optional)                  |
+-+-+-+-+-+-+-+-+-+-+-+-+-+-+-+-+-+-+-+-+-+-+-+-+-+-+-+-+-+-+-+-+
| GVer | Rsvd2 |    Count         |        Offset 1              |
+-+-+-+-+-+-+-+-+-+-+-+-+-+-+-+-+-+-+-+-+-+-+-+-+-+-+-+-+-+-+-+-+
|       Offset 2                  |        offset 3              |
+-+-+-+-+-+-+-+-+-+-+-+-+-+-+-+-+-+-+-+-+-+-+-+-+-+-+-+-+-+-+-+-+
        . . . . .
+-+-+-+-+-+-+-+-+-+-+-+-+-+-+-+-+-+-+-+-+-+-+-+-+-+-+-+-+-+-+-+-+
|      Offset N                   |
+-+-+-+-+-+-+-+-+-+-+-+-+-+-+-+-+-+
```

FIG. 5

```
                       Tunneling Header
                             600

********************************************

0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |C|G|K|S| Reserved0       | Ver |         Protocol Type         |
 +-+-+-+-+-+-+-+-+-+-+-+-+-+-+-+-+-+-+-+-+-+-+-+-+-+-+-+-+-+-+-+-+
 |      Checksum (optional)        |       Reserved1 (Optional)  |
 +-+-+-+-+-+-+-+-+-+-+-+-+-+-+-+-+-+-+-+-+-+-+-+-+-+-+-+-+-+-+-+-+
 |                         Key (optional)                        |
 +-+-+-+-+-+-+-+-+-+-+-+-+-+-+-+-+-+-+-+-+-+-+-+-+-+-+-+-+-+-+-+-+
 |                    Sequence Number (Optional)                 |
 +-+-+-+-+-+-+-+-+-+-+-+-+-+-+-+-+-+-+-+-+-+-+-+-+-+-+-+-+-+-+-+-+
 | GVer | Rsvd2 |   Count    |          Offset 1                 |
 +-+-+-+-+-+-+-+-+-+-+-+-+-+-+-+-+-+-+-+-+-+-+-+-+-+-+-+-+-+-+-+-+
 |         Offset 2           |          Offset 3                |
 +-+-+-+-+-+-+-+-+-+-+-+-+-+-+-+-+-+-+-+-+-+-+-+-+-+-+-+-+-+-+-+-+
                . . . . .
 +-+-+-+-+-+-+-+-+-+-+-+-+-+-+-+-+-+-+-+-+-+-+-+-+-+-+-+-+-+-+-+-+
 |         Offset N           |          Packet 1                |
 +-+-+-+-+-+-+-+-+-+-+-+-+-+-+-+-+-+-+-+-+-+-+-+-+-+-+-+-+-+-+-+-+
                . . . . .
 +-+-+-+-+-+-+-+-+-+-+-+-+-+-+-+-+-+-+-+-+-+-+-+-+-+-+-+-+-+-+-+-+
 |           . . .            |          Packet N                |
 +-+-+-+-+-+-+-+-+-+-+-+-+-+-+-+-+-+-+-+-+-+-+-+-+-+-+-+-+-+-+-+-+

APPARATUS, SYSTEM, AND METHOD FOR INCREASING BANDWIDTH UTILIZATION IN ENCAPSULATION TUNNELS

PRIORITY CLAIM

This application claims priority to Indian Provisional Application No. 202011020883 filed on 18 May 2020 with the Indian Patent Office, the disclosure of which is incorporated in its entirety by this reference.

BACKGROUND

Encapsulation tunnels, such as Generic Routing Encapsulation (GRE) tunnels, are often used to forward traffic from one network to another. For example, a GRE tunnel may originate in a private network and then pass through a public network. In this example, traffic may be encapsulated at the origin of the GRE tunnel such that computing devices included in the public network are unable to decipher the contents of the passing traffic. Accordingly, this encapsulation may provide and/or represent an increased level of security for such traffic.

Unfortunately, some traditional encapsulation technologies may suffer from certain drawbacks and/or deficiencies that prevent encapsulation tunnels from achieving their full potential in terms of bandwidth utilization. For example, a traditional GRE tunnel may carry a significant number of packets whose sizes fall far below the Maximum Transmission Unit (MTU) of the GRE tunnel. As a result, the bandwidth of this traditional GRE tunnel may be greatly underutilized.

The instant disclosure, therefore, identifies and addresses a need for additional and improved apparatuses, systems, and methods for increasing bandwidth utilization in encapsulation tunnels.

SUMMARY

As will be described in greater detail below, the instant disclosure generally relates to apparatuses, systems, and methods for increasing bandwidth utilization in encapsulation tunnels. In one example, a method for accomplishing such a task may include (1) identifying a packet that enters a start point of an encapsulation tunnel that spans at least a portion of a network, (2) discovering a maximum transmission unit of the encapsulation tunnel, (3) determining whether a size of the packet satisfies a size threshold that is based at least in part on the maximum transmission unit of the encapsulation tunnel, (4) detecting an encapsulation-triggering event in connection with the packet, and then in response to detecting the encapsulation-triggering event, (5) forwarding the packet via the start point of the encapsulation tunnel toward an end point of the encapsulation tunnel.

Similarly, a system that implements the above-identified method may include at least one physical processor configured to execute various modules stored in memory. In one example, this system may include and/or execute (1) an identification module that identifies a packet that enters a start point of an encapsulation tunnel that spans at least a portion of a network, (2) an encapsulation module that (A) discovers a maximum transmission unit of the encapsulation tunnel, (B) determines whether a size of the packet satisfies a size threshold that is based at least in part on the maximum transmission unit of the encapsulation tunnel, and (C) detects an encapsulation-triggering event in connection with the packet, and (3) a forwarding module that forwards the packet via the start point of the encapsulation tunnel toward an end point of the encapsulation tunnel in response to the encapsulation-triggering event.

Additionally or alternatively, an apparatus that implements the above-identified method may include at least one storage device that stores, at a start point of an encapsulation tunnel, a module that enables the start point to encapsulate tunneling packets via a tunneling protocol. This apparatus may also include at least one physical processor communicatively coupled to the storage device. This physical process may (1) identifies a packet that enters the start point of the encapsulation tunnel, (2) discovers a maximum transmission unit of the encapsulation tunnel, (3) determines whether a size of the packet satisfies a size threshold that is based at least in part on the maximum transmission unit of the encapsulation tunnel, (4) detects an encapsulation-triggering event in connection with the packet, and then in response to detecting the encapsulation-triggering event, (5) forwards the packet via the start point of the encapsulation tunnel toward an end point of the encapsulation tunnel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary tunneling header implemented in a system for increasing bandwidth utilization in encapsulation tunnels.

FIG. 6 is an illustration of an exemplary tunneling packet implemented in a system for increasing bandwidth utilization in encapsulation tunnels.

Figure 1:
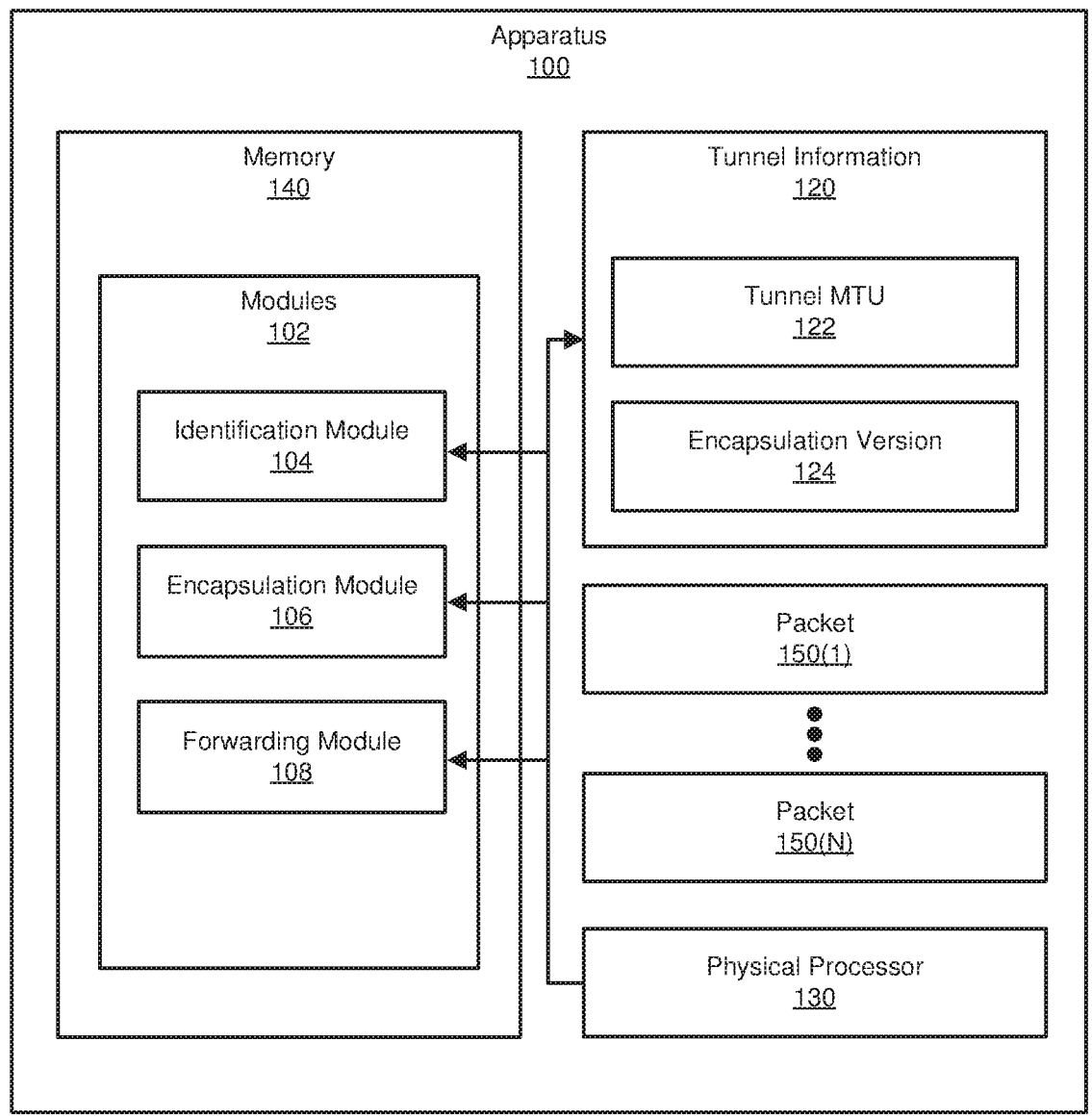
FIG. 1 is a block diagram of an exemplary apparatus for increasing bandwidth utilization in encapsulation tunnels.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for increasing bandwidth utilization in encapsulation tunnels. As will be explained in greater detail below, the various apparatuses, systems, and methods described herein may provide various benefits and/or advantages over some traditional encapsulation technologies. For example, the various systems and methods described herein may postpone and/or pause forwarding traffic through a GRE tunnel unless and/or until one or more criteria are satisfied. In some examples, a network packet may arrive at the start point of a GRE tunnel. As the network packet arrives, the start point may refrain from and/or postpone forwarding the network packet to its next hop if the network packet's size is below a certain threshold (e.g., the MTU of the GRE tunnel).

Instead of forwarding the network packet immediately, the start point may wait for one or more additional network packets to arrive. Once the cumulative size of the network packet and the additional network packets reaches the threshold, the start point may encapsulate all those network packets into one GRE packet. The start point may then forward that GRE packet through the GRE tunnel toward an end point that decapsulates the GRE packet back into the individual and/or constituent network packets.

However, if a certain amount of time passes while waiting for additional network packets to arrive, the start point may encapsulate the network packets that have already arrived into one GRE packet even though the cumulative size of those network packets has yet to reach the threshold. The start point may then forward that GRE packet through the GRE tunnel toward the end point. Upon receiving the GRE packet, the end point may decapsulate the GRE packet back into the individual and/or constituent network packets that arrived at the start point prior to the passing of the certain amount of time. By postponing and/or pausing the forwarding of traffic unless and/or until one or more of these criteria are satisfied, the various apparatuses, systems, and methods described herein may be able to increase the bandwidth utilization and/or efficiency of GRE tunnels.

Figure 2:
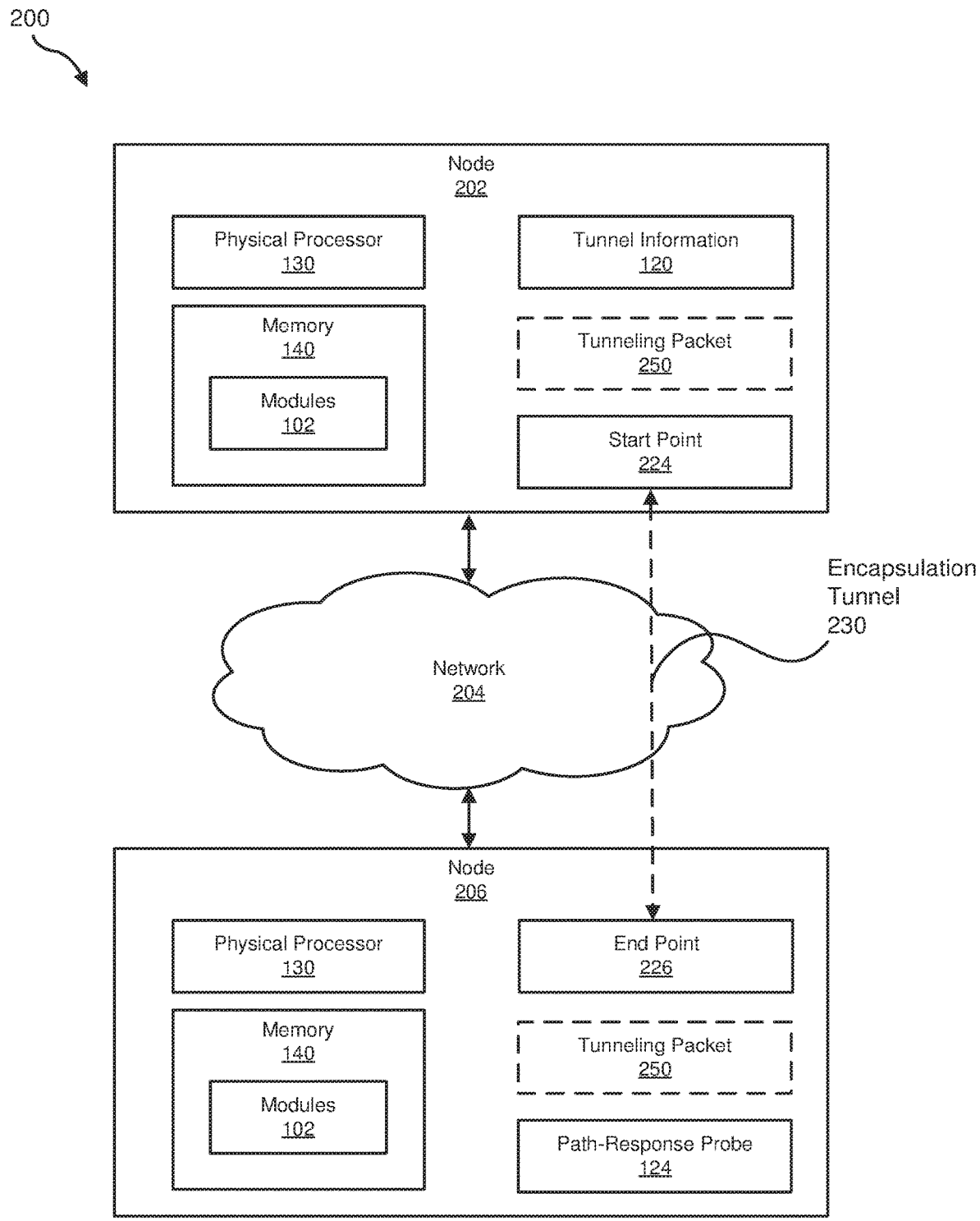
FIG. 2 is a block diagram of an exemplary system for increasing bandwidth utilization in encapsulation tunnels.
Figure 3:
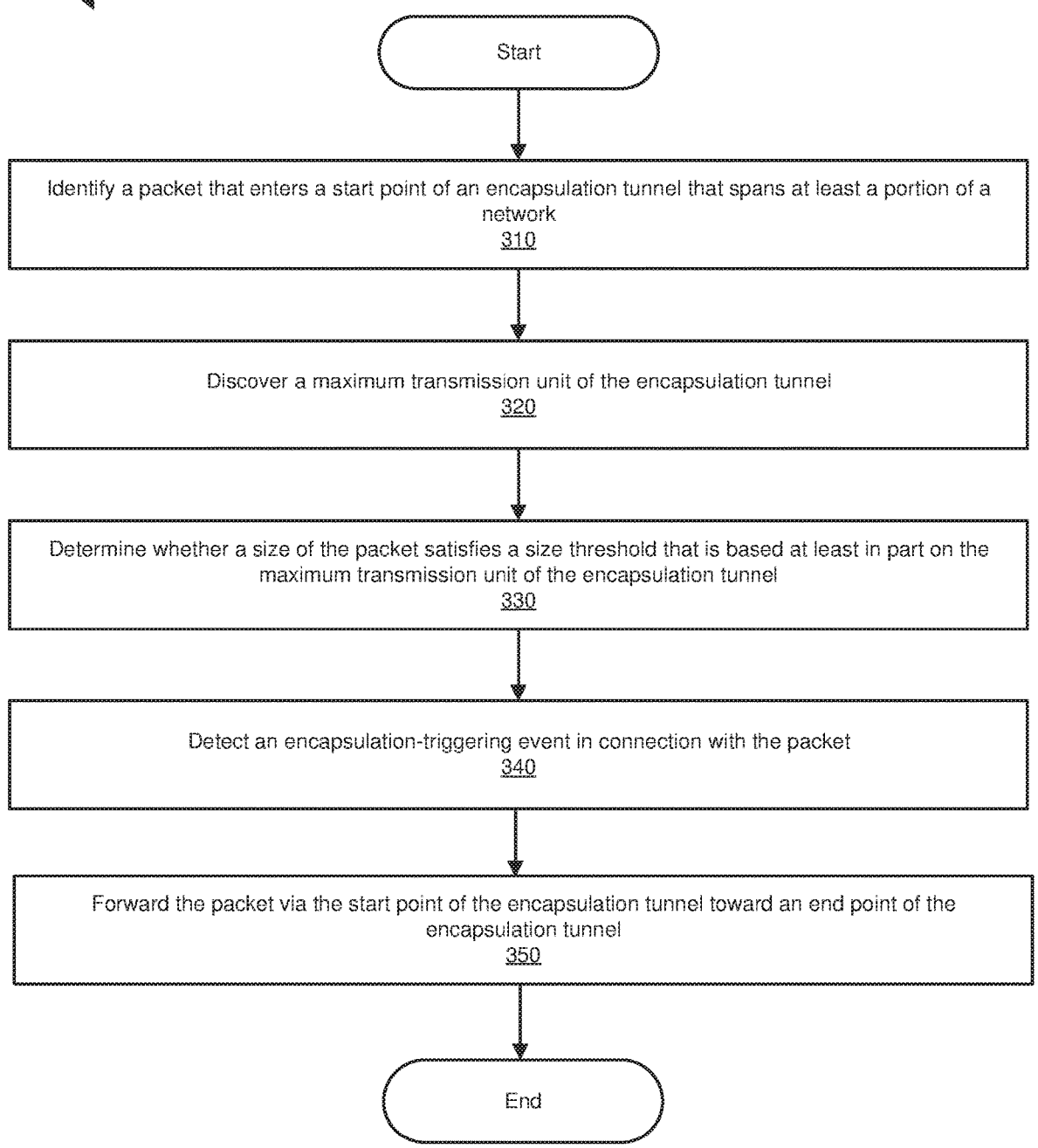
FIG. 3 is a flow diagram of an exemplary method for increasing bandwidth utilization in encapsulation tunnels.
Figure 4:
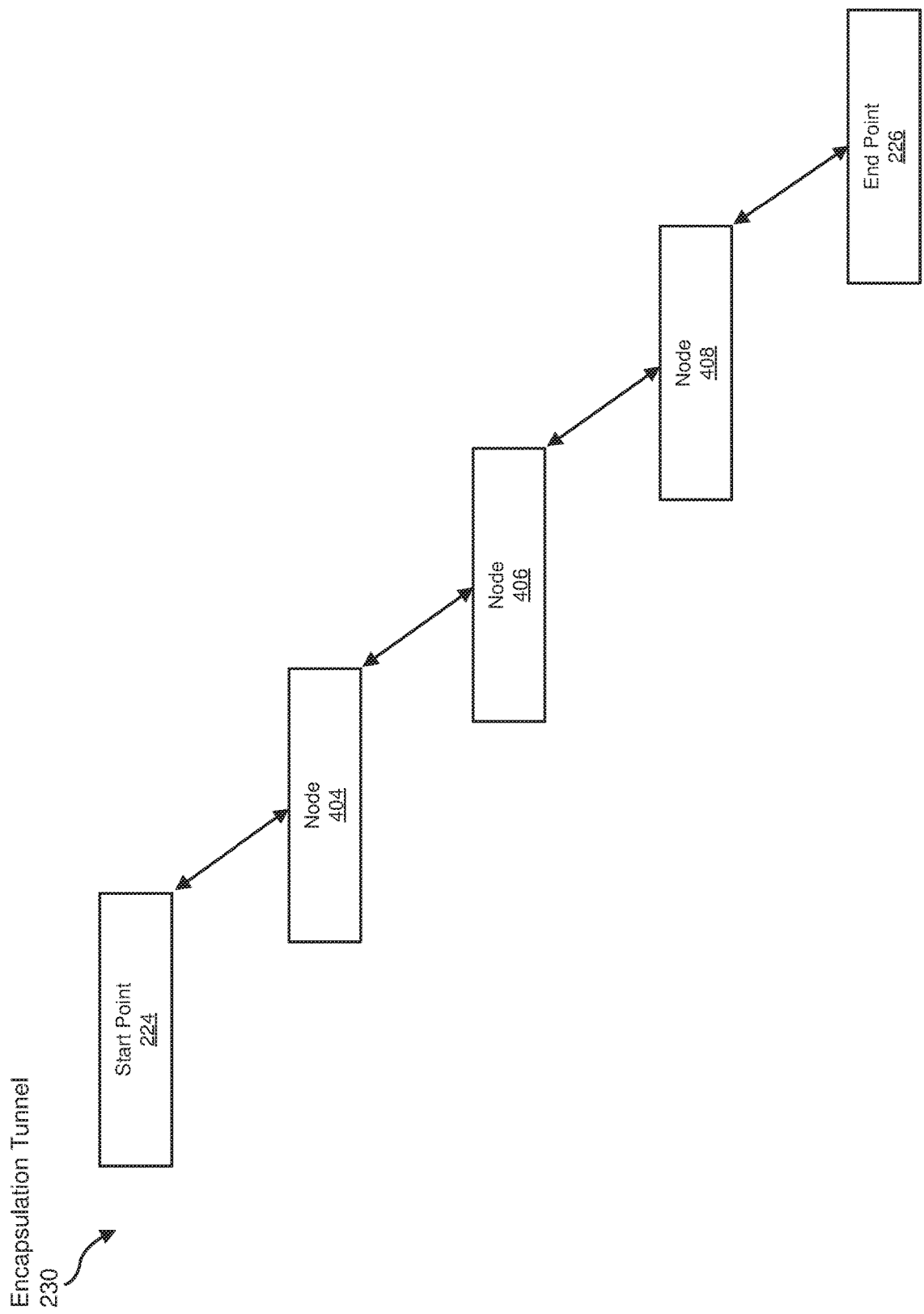
FIG. 4 is a block diagram of an exemplary encapsulation tunnel implemented across various nodes of a network.

The following will provide, with reference to FIGS. 1, 2, and 4, detailed descriptions of exemplary apparatuses, systems, and corresponding implementations for increasing bandwidth utilization in encapsulation tunnels. Detailed descriptions of an exemplary method for increasing bandwidth utilization in encapsulation tunnels will be provided in connection with FIG. 3. Detailed descriptions of exemplary tunneling headers applied to and/or included in tunneling packets will be provided in connection with FIGS. 5 and 6. In addition, detailed descriptions of an exemplary computing system for carrying out these methods will be provided in connection with FIG. 7.

FIG. 1 shows an exemplary apparatus 100 that facilitates increasing bandwidth utilization in encapsulation tunnels. As illustrated in FIG. 1, apparatus 100 may include one or more modules 102 for performing one or more tasks. As will be explained in greater detail below, modules 102 may include an identification module 104, an encapsulation module 106, and/or a forwarding module 108. Although illustrated as separate elements, one or more of modules 102 in FIG. 1 may represent portions of a single module, application, process, and/or operating system. For example, one or more of modules 102 may represent part of and/or be included in one or more GRE processes running on a computing device.

In certain embodiments, one or more of modules 102 in FIG. 1 may represent one or more software applications or programs that, when executed by a computing device, cause the computing device to perform one or more tasks. For example, and as be described in greater detail below, one or more of modules 102 may represent modules stored and configured to run on one or more computing devices, such as the devices illustrated in FIG. 2 (e.g., node 202 and/or node 206) and/or the devices illustrated in FIG. 4 (e.g., start point 402, node 404, node 406, node 408, and/or end point 410). One or more of modules 102 in FIG. 1 may also represent all or portions of one or more special-purpose computers configured to perform one or more tasks.

As illustrated in FIG. 1, exemplary apparatus 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary apparatus 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate increasing bandwidth utilization in encapsulation tunnels. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary apparatus 100 may further include certain tunnel information, such as tunnel information 120. In some examples, tunnel information 120 may include and/or represent various details specific to an encapsulation tunnel implemented between a start point and an end point within a network and/or across networks. In one example, tunnel information 120 may identify and/or indicate a tunnel MTU 122 and/or an encapsulation version 124.

As illustrated in FIG. 1, exemplary apparatus 100 may additionally include one or more packets, such as packets 150(1)-(N). In some examples, packets 150(1)-(N) may include and/or represent any network packets that conform to and/or follow one or more protocols and/or layers of the Open Systems Interconnection (OSI) model. For example, packets 150(1)-(N) may include and/or represent physical layer packets, data link layer packets, network layer packets, transport layer packets, session layer packets, presentation layer packets, and/or application layer packets. Additionally or alternatively, packets 150(1)-(N) may include and/or represent any network packets that conform to and/or follow one or more protocols and/or layers of the Internet Protocol Suite (TCP/IP). In one example, packets 150(1)-(N) may each include and/or represent a header and/or a payload.

In some examples, apparatus 100 in FIG. 1 may be implemented in a variety of ways. For example, all or a portion of exemplary apparatus 100 may represent portions of exemplary system 200 in FIG. 2. As shown in FIG. 2, system 200 may include a network 204 that facilitates communication among various computing devices, including node 202 and/or node 206. Although FIG. 2 illustrates nodes 202 and 206 as being external to network 204, nodes 202 and 206 may alternatively represent part of and/or be included within network 204.

In some examples, network 204 may include and/or represent various network devices that form and/or establish communication paths and/or segments. For example, network 204 may include and/or represent one or more segment routing paths. Although not illustrated in this way in FIG. 2, network 204 may include and/or represent one or more additional network devices and/or computing devices.

In some examples, and as will be described in greater detail below, one or more of modules 102 may cause node 202 to (1) identify a packet 150(1) that enters a start point 224 of an encapsulation tunnel 230 that spans at least a portion of network 204, (2) discover a maximum transmission unit of encapsulation tunnel 230, (3) determine whether a size of packet 150(1) satisfies a size threshold that is based at least in part on the maximum transmission unit of encapsulation tunnel 230, (4) detect an encapsulation-triggering event in connection with packet 150(1), and then in response to detecting the encapsulation-triggering event, (5) forward packet 150(1) via start point 224 of encapsulation tunnel 230 toward an end point 226 of encapsulation tunnel 230.

Nodes 202 and 206 each generally represent any type or form of physical computing device capable of reading computer-executable instructions and/or handling network traffic. Examples of nodes 202 and 206 include, without limitation, routers (such as provider edge routers, hub routers, spoke routers, autonomous system boundary routers, and/or area border routers switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable devices.

Network 204 generally represents any medium or architecture capable of facilitating communication or data transfer. In some examples, network 204 may include other devices not illustrated in FIG. 2 that facilitate communication and/or form part of routing paths between node 202 and node 206. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for increasing bandwidth utilization in encapsulation tunnels. The steps shown in FIG. 3 may be performed by any suitable computer-executable code and/or computing system, including apparatus 100 in FIG. 1, system 200 in FIG. 2, system 4 in FIG. 4, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a packet that enters a start point of an encapsulation tunnel that spans at least a portion of a network. For example, identification module 104 may, as part of node 202 in FIG. 2, identify packet 150(1) that enters start point 224 of encapsulation tunnel 230 that spans at least a portion of network 204. In one example, packet 150(1) may include and/or represent an OSI packet or a TCP/IP packet. In this example, encapsulation tunnel 230 may include and/or represent a GRE tunnel implemented between start point 224 and end point 226.

The systems described herein may perform step 310 in a variety of ways and/or contexts. In some examples, identification module 104 may monitor node 202 for incoming network packets arriving from one or more external devices. In such examples, while monitoring node 202 in this way, identification module 104 may detect and/or receive packet 150(1) as it arrives at and/or reaches node 202.

In some examples, packet 150(1) may be routed through encapsulation tunnel 230 toward node 206. Additionally or alternatively, packet 150(1) may be destined for a computing device that is reachable via node 206. In one example, identification module 104 may identify and/or detect packet 150(1) before packet 150(1) is encapsulated using a tunneling protocol and/or forwarded via encapsulation tunnel 230.

Returning to FIG. 3, at step 320 one or more of the systems described herein may discover an MTU of the encapsulation tunnel. For example, encapsulation module 106 may, as part of node 202 in FIG. 2, discover an MTU of encapsulation tunnel 230. In one example, the MTU of encapsulation tunnel 230 may equate to and/or parallel the smallest and/or lowest MTU of the physical interfaces involved or incorporated in encapsulation tunnel 230.

The systems described herein may perform step 320 in a variety of ways and/or contexts. In some examples, encapsulation module 106 may identify and/or determine the MTU of encapsulation tunnel 230 by way of a Path MTU (PMTU) discovery mechanism. In other examples, encapsulation module 106 may identify and/or determine the smallest and/or lowest MTU of the physical interfaces involved or incorporated in encapsulation tunnel 230. These physical interfaces may form part of and/or be included in the portion of network 204 spanned by encapsulation tunnel 230. In such examples, encapsulation module 106 may equate, impute, assign, and/or attribute the smallest and/or lowest MTU of those interfaces to the MTU of encapsulation tunnel 230. As a result, the MTU of encapsulation tunnel 230 may have approximately the same MTU as one of those interfaces.

In some examples, encapsulation module 106 may discover the MTU of encapsulation tunnel 230 by searching and/or reviewing tunnel information 120. In other examples, encapsulation module 106 may record and/or store the MTU of encapsulation tunnel 230 in tunnel information 120.

Returning to FIG. 3, at step 330 one or more of the systems described herein may determine whether a size of the packet satisfies a size threshold that is based at least in part on the MTU of the encapsulation tunnel. For example, encapsulation module 106 may, as part of node 202 in FIG. 2, determine whether a size of packet 150(1) satisfies a size threshold that is based at least in part on the MTU of encapsulation tunnel 230. In one example, the size threshold may equate to and/or be commensurate with the MTU of encapsulation tunnel 230. Additionally or alternatively, the size threshold may be slightly smaller and/or lower than the MTU of encapsulation tunnel 230. The purpose for the slightly smaller and/or lower size of this threshold may be to reserve sufficient space for tunneling headers within tunneling packets that traverse encapsulation tunnel 230.

The systems described herein may perform step 330 in a variety of ways and/or contexts. In some examples, encapsulation module 106 may identify and/or determine the size of packet 150(1). In one example, encapsulation module 106 may measure and/or read the size of packet 150(1). Additionally or alternatively, encapsulation module 106 may determine and/or set the size threshold to any size and/or number suitable for achieving a certain purpose and/or objective with respect to the bandwidth utilization of encapsulation tunnel 230.

In some examples, encapsulation module 106 may compare the size of packet 150(1) to the size threshold that based at least in part on the MTU of encapsulation tunnel 230. The result of this comparison may lead and/or influence node 202 to perform certain actions in connection with forwarding packet 150(1) through encapsulation tunnel 230. For example, if the size of packet 150(1) satisfies the size threshold, encapsulation module 106 may encapsulate packet 150(1) alone as a tunneling packet 250 suitable for traversing encapsulation tunnel 230. In another example, if the size of packet 150(1) does not satisfy the size threshold, encapsulation module 106 may wait for the arrival of one or more additional packets at node 202 before encapsulating packet 150(1). In this example, once enough additional packets to satisfy the size threshold have arrived, encapsulation module 106 may encapsulate all those packets, including packet 150(1), together as tunneling packet 250.

In some examples, to prevent prolonged periods of inactivity and/or underutilization on encapsulation tunnel 230, encapsulation module 106 may determine and/or set a maximum time interval for encapsulation tunnel 230. In one example, this time interval may represent the maximum amount of time between tunneling packet transmissions. Additionally or alternatively, this time interval may represent the maximum amount of time to wait for additional network packets before encapsulating and/or forwarding a tunneling packet. In other words, even if the cumulative size of the network packets that arrive at start point 224 during a certain time interval does not satisfy the size threshold, encapsulation module 106 may still encapsulate those network packets into a single tunneling packet and then forward the same via encapsulation tunnel 230 once that time interval expires.

As a specific example, if the MTU of encapsulation tunnel 230 is 10,000 bytes, encapsulation module 106 may set and/or configure the size threshold to 9,900 bytes. In this example, encapsulation module 106 may calculate and/or determine the size threshold by subtracting a header size (e.g., 100 bytes) from the MTU of encapsulation tunnel 230. The 100-byte difference between the MTU of encapsulation tunnel 230 and the size threshold may be reserved and/or preserved for accommodating the header of a GRE packet. Accordingly, the header of this GRE packet may include and/or represent up to 100 bytes of metadata.

Continuing with this example, if the size of network packets arriving at node 202 for entry into encapsulation tunnel 230 is 100 bytes, encapsulation module 106 may await the arrival of 99 network packets for encapsulation into a single GRE packet. For example, once those 99 network packets have arrived, encapsulation module 106 may determine that the cumulative size of those 99 network packets satisfies the 9,900-byte size threshold. Encapsulation module 106 may then group those 99 network packets together and/or encapsulate the entire group into a single GRE packet. Accordingly, encapsulation module 106 may group together and/or encapsulate a set of network packets due at least in part to their cumulative size satisfying the size threshold.

As a further example, encapsulation module 106 may set and/or configure the maximum time interval of encapsulation tunnel 230 to 1 millisecond. In this example, if 2 network packets arrive at encapsulation tunnel 230 every millisecond and their size is 100 bytes each, encapsulation module 106 may encapsulate 2 network packets into a single GRE packet every millisecond even though the cumulative size of those network packets is far less than the 9,900-byte size threshold. Accordingly, encapsulation module 106 may group together and/or encapsulate a set of network packets due at least in part to the 1-millisecond time interval having expired while awaiting additional network packets.

In some examples, the encapsulation of tunneling packet 250 may be performed using a tunneling protocol, such as the GRE protocol. In one example, the encapsulation of tunneling packet 250 may include and/or involve encrypting and/or encoding all or a portion of packet 150(1). Accordingly, tunneling packet 250 may carry an encrypted version of all or a portion of packet 150(1) from start point 224 to end point 226 via encapsulation tunnel 230.

FIG. 4 illustrates an exemplary implementation of encapsulation tunnel 230 that includes and/or represents start point 224, a node 404, a node 406, a node 408, and/or end point 226. As illustrated in FIG. 4, start point 224, node 404, node 406, node 408, and/or end point 226 may represent the portion of network 204 spanned by encapsulation tunnel 230. In this example, start point 224 and end point 226 may each be configured and/or programmed with an instance of a module that enables them to decipher the headers of tunneling packets. In contrast, nodes 404, 406, and 408 may be unable to decipher the headers of tunneling packets because those nodes are not configured and/or programmed with any instances of such a module.

In some examples, encapsulation module 106 may encapsulate one or more packets into a tunneling packet with a tunneling header. In such examples, the tunneling header may identify and/or indicate certain information about that tunneling packet. Examples of such information include, without limitation, an indication of whether a tunneling packet is an encapsulation of multiple network packets, a version of encapsulation or tunneling applied to a tunneling packet, a count that indicates the total number of network packets that are encapsulated in a tunneling packet, an offset that indicates a starting position of a payload included in a tunneling packet, combinations or variations of one or more of the same, and/or any other suitable tunnel information.

FIG. 5 illustrates an exemplary tunneling header 500 of a tunneling packet. As illustrated in FIG. 5, tunneling header 500 may include a "G" bit that indicates whether the corresponding tunneling packet is carrying multiple network packets. In this example, tunneling header 500 may include a "GVer" nibble that indicates a version of the corresponding encapsulation and/or header version. Additionally or alternatively, tunneling header 500 may include a "Count" byte that indicates the number of network packets encapsulated into the corresponding tunneling packet. Further, tunneling header 500 may include one or more "Offsets" that indicate the starting positions of the packet payloads encapsulated within the tunneling packet.

FIG. 6 illustrates an exemplary tunneling packet 600 that includes both a tunneling header and multiple packet payloads. As illustrated in FIG. 6, tunneling packet 600 may include and/or represent the various header fields and/or details described above in connection with tunneling header 500. In this example, tunneling packet 600 may also include and/or represent the "Packet" payloads whose locations and/or starting positions are referenced or indicated by the "Offsets" identified in the header information.

Returning to FIG. 3, at step 340 one or more of the systems described herein may detect an encapsulation-triggering event in connection with the packet. For example, encapsulation module 106 may, as part of node 202 in FIG. 2, detect an encapsulation-triggering event in connection with packet 150(1). In one example, the encapsulation-triggering event may be the accumulation of enough network packet data at start point 224 of encapsulation tunnel 230 to satisfy the size threshold. In another example, the encapsulation-triggering event may be the expiration of a certain time interval while awaiting the arrival of enough network packet data to satisfy the size threshold.

The systems described herein may perform step 340 in a variety of ways and/or contexts. In some examples, encapsulation module 106 may continue to check whether the cumulative size of the packets that arrive at start point 224 during a certain time interval satisfy and/or reach the size threshold. In one example, if the cumulative size of those packets satisfies the size threshold during the time interval, encapsulation module 106 may consider and/or deem the satisfaction of this size threshold to be an encapsulation-triggering event. In response to this encapsulation-triggering event, encapsulation module 106 may encapsulate those packets into a single tunneling packet destined for encapsulation tunnel 230.

In another example, lithe cumulative size of those packets does not satisfy the size threshold during the time interval, encapsulation module 106 may consider and/or deem the expiration of the time interval to be an alternative encapsulation-triggering event even though the cumulative size of those packets does not satisfy the size threshold. In response to this alterative encapsulation-triggering event, encapsulation module 106 may encapsulate those packets into a single tunneling packet destined for encapsulation tunnel 230.

Returning to FIG. 3, at step 350 one or more of the systems described herein may forward the packet via the start point of the encapsulation tunnel toward an end point of the encapsulation tunnel in response to detecting the encapsulation-triggering event. For example, forwarding module 108 may, as part of node 202 in FIG. 2, forward packet 150(1) via start point 224 of encapsulation tunnel 230 toward end point 226 of encapsulation tunnel 230 in response to the encapsulation-triggering event. In this example, packet 150(1) may be encapsulated into tunneling packet 250 prior to transmission. Accordingly, tunneling packet 250 may carry packet 150(1) from start point 224 to end point 226 via encapsulation tunnel 230.

The systems described herein may perform step 350 in a variety of ways and/or contexts. In some examples, forwarding module 108 may pass tunneling packet 250 into encapsulation tunnel 230 at start point 224. In one example, tunneling packet 250 may carry and/or include only packet 150(1). In another example, tunneling packet 250 may carry and/or include packet 150(1) along with one or more additional network packets.

In some examples, tunneling packet 250 may traverse through encapsulation tunnel 230 and then exit at end point 226 of node 206. As tunneling packet 250 exits encapsulation tunnel 230, end point 226 and/or node 206 may receive tunneling packet 250. End point 226 and/or node 206 may then decapsulate tunneling packet 250 into its individual and/or constituent network packets, including packet 150(1), based at least in part on the tunneling header.

Upon the decapsulation of tunneling packet 250, node 206 may forward those individual and/or constituent packets to their next hop(s). By doing so, node 206 may facilitate the flow of such packets toward and/or on the way to their final destinations) for consumption.

Figure 7:
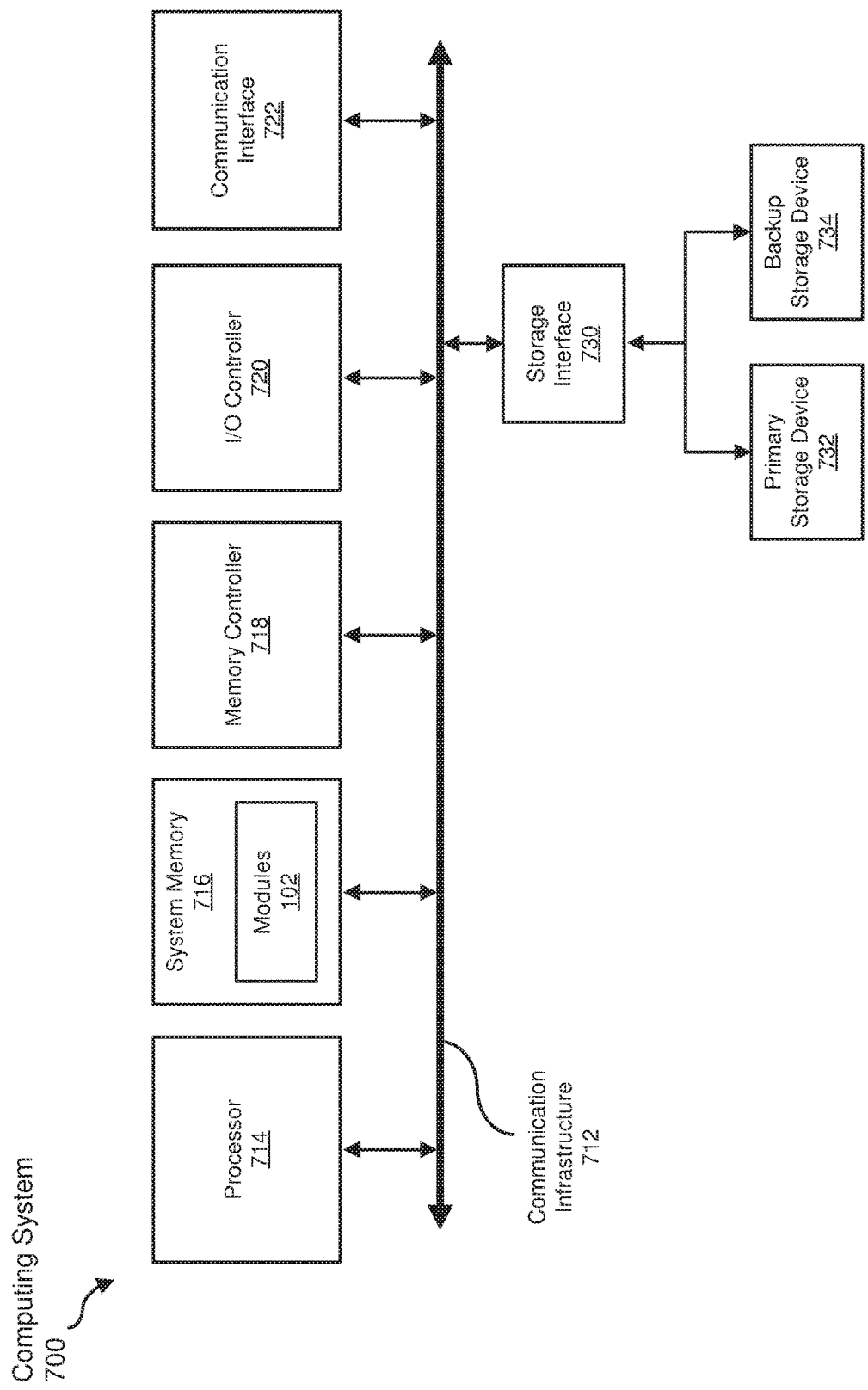
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATH), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a packet that enters a start point of an encapsulation tunnel that spans at least a portion of a network;
   discovering a maximum transmission unit of the encapsulation tunnel;
   checking, during a certain time interval, whether enough network packet data has entered the start point of the encapsulation tunnel to satisfy a size threshold of the encapsulation tunnel that is based at least in part on the maximum transmission unit of the encapsulation tunnel;
   determining that the size threshold of the encapsulation tunnel has not been satisfied at an expiration of the certain time interval despite the packet having entered the start point of the encapsulation tunnel;
   detecting an encapsulation-triggering event in connection with the packet, wherein the encapsulation-triggering event comprises the expiration of the certain time interval while awaiting arrival of enough network packet data to satisfy the size threshold; and
   in response to detecting the encapsulation-triggering event:
     encapsulating the packet; and
     forwarding the packet via the start point of the encapsulation tunnel toward an end point of the encapsulation tunnel.

2. The method of claim 1, wherein checking whether enough network packet data has entered the start point of the encapsulation tunnel to satisfy the size threshold of the encapsulation tunnel comprises:
   determining that the size of the packet does not satisfy the size threshold;
   in response to determining that the size of the packet does not satisfy the size threshold, awaiting one or more additional packets prior to forwarding the packet via the start point of the encapsulation tunnel; and
   upon arrival of the one or more additional packets at the start point of the encapsulation tunnel, determining that a cumulative size of the packet and the one or more additional packets do not satisfy the size threshold.

3. The method of claim 2, wherein forwarding the packet via the start point of the encapsulation tunnel comprises:
   in response to detecting the encapsulation-triggering event encapsulating the packet and the one or more additional packets together as a single tunneling packet; and
   forwarding the single tunneling packet via the start point of the encapsulation tunnel.

4. The method of claim 1, wherein checking whether enough network packet data has entered the start point of the encapsulation tunnel to satisfy the size threshold of the encapsulation tunnel comprises:
   determining that the size of the packet does not satisfy the size threshold;
   detecting the encapsulation-triggering event comprises:
     in response to determining that the size of the packet does not satisfy the size threshold, awaiting at least one additional packet whose size, when combined with the size of the packet, does not satisfy the size threshold; and while awaiting the at least one additional packet, detecting the expiration of the certain time interval.

5. The method of claim 4, wherein forwarding the packet via the start point of the encapsulation tunnel comprises:

in response to detecting the expiration of the certain time interval while awaiting the at least one additional packet, encapsulating the packet into a tunneling packet via a tunneling protocol even though the tunneling packet does not satisfy the size threshold; and forwarding the tunneling packet via the start point of the encapsulation tunnel.

6. The method of claim 1, wherein discovering the maximum transmission unit of the encapsulation tunnel comprises:

identifying a maximum transmission unit of a physical interface included in the portion of the network spanned by the encapsulation tunnel; and equating the maximum transmission unit of the encapsulation tunnel to the maximum transmission unit of the physical interface.

7. The method of claim 1, further comprising determining the size threshold by:

subtracting a header size from the maximum transmission unit of the encapsulation tunnel; and equating the size threshold to a result of the subtraction.

8. The method of claim 1, further comprising, prior to forwarding the packet via the start point of the encapsulation tunnel, encapsulating the packet with one or more additional packets together as a single tunneling packet; and wherein forwarding the packet via the start point of the encapsulation tunnel comprises forwarding the single tunneling packet via the start point of the encapsulation tunnel.

9. The method of claim 8, wherein encapsulating the packet with the one or more additional packets comprises encapsulating the packet and the one or more additional packets with a tunneling header that identifies certain information about the single tunneling packet.

10. The method of claim 9, wherein the certain information identified in the tunneling header comprises at least one of:

an indication of whether the single tunneling packet is an encapsulation of multiple packets;

a version of encapsulation applied to the single tunneling packet;

a count that indicates a total number of packets that are encapsulated in the single tunneling packet; or an offset that indicates a starting position of a payload included in the single tunneling packet.

11. The method of claim 9, further comprising:

receiving the single tunneling packet at the end point of the encapsulation tunnel; and decapsulating, at the end point of the encapsulation tunnel, the single tunneling packet into the packet and the one or more additional packets based at least in part on the tunneling header.

12. The method of claim 9, wherein the portion of the network spanned by the encapsulation tunnel comprises:

the start point of the encapsulation tunnel;

the end point of the encapsulation tunnel; and one or more intermediary nodes between the start point and the end point.

13. The method of claim 12, wherein:

the start point of the encapsulation tunnel is configured with an instance of a module that enables the start point to decipher the tunneling header;

the end point of the encapsulation tunnel is configured with another instance of the module that enables the end point to decipher the tunneling header; and the one or more intermediary nodes are unable to decipher the tunneling header due at least in part to the one or more intermediary nodes not being configured with any instance of the module.

14. A system comprising:

an identification module, stored in memory, that identifies a packet that enters a start point of an encapsulation tunnel that spans at least a portion of a network;

an encapsulation module, stored in memory, that:

discovers a maximum transmission unit of the encapsulation tunnel;

checking, during a certain time interval, whether enough network packet data has entered the start point of the encapsulation tunnel to satisfy a size threshold of the encapsulation tunnel that is based at least in part on the maximum transmission unit of the encapsulation tunnel;

determines that the size threshold of the encapsulation tunnel has not been satisfied at an expiration of the certain time interval despite the packet having entered the start point of the encapsulation tunnel;

detects an encapsulation-triggering event in connection with the packet, wherein the encapsulation-triggering event comprises the expiration of the certain time interval while awaiting arrival of enough network packet data to satisfy the size threshold; and encapsulates the packet in response to the encapsulation-triggering event;

a forwarding module, stored in memory, that forwards the packet via the start point of the encapsulation tunnel toward an end point of the encapsulation tunnel; and at least one physical processor configured to execute the identification module, the encapsulation module, and the forwarding module.

15. The system of claim 14, wherein the encapsulation module:

determines that the size of the packet does not satisfy the size threshold;

awaits, in response to the size of the packet not satisfying the size threshold, one or more additional packets prior to forwarding the packet via the start point of the encapsulation tunnel; and determines, upon arrival of the one or more additional packets at the start point of the encapsulation tunnel, that a cumulative size of the packet and the one or more additional packets do not satisfy the size threshold.

16. The system of claim 15, wherein:

the encapsulation module, in response to detecting the encapsulation-triggering event, encapsulates the packet and the one or more additional packets together as a single tunneling packet; and the forwarding module forwards the single tunneling packet via the start point of the encapsulation tunnel.

17. The system of claim 14, wherein the encapsulation module:

determines that the size of the packet does not satisfy the size threshold;

in response to the size of the packet not satisfying the size threshold, awaits at least one additional packet whose size, when combined with the size of the packet, does not satisfy the size threshold; and while awaiting the at least one additional packet, detects the expiration of the certain time interval.

18. The system of claim 17, wherein:

the encapsulation module, in response to the expiration of the certain time interval while awaiting the at least one additional packet, encapsulates the packet into a tunneling packet via a tunneling protocol even though the tunneling packet does not satisfy the size threshold; and the forwarding module forwards the tunneling packet via the start point of the encapsulation tunnel.

19. An apparatus comprising:

at least one storage device that stores, at a start point of an encapsulation tunnel, a module that enables the start point to encapsulate tunneling packets via a tunneling protocol; and at least one physical processor communicatively coupled to the storage device, wherein the physical processor:

identifies a packet that enters the start point of the encapsulation tunnel;

discovers a maximum transmission unit of the encapsulation tunnel;

checks, during a certain time interval, whether enough network packet data has entered the start point of the encapsulation tunnel to satisfy a size threshold of the encapsulation tunnel that is based at least in part on the maximum transmission unit of the encapsulation tunnel;

determines that the size threshold of the encapsulation tunnel has not been satisfied at an expiration of the certain time interval despite the packet having entered the start point of the encapsulation tunnel;

detects an encapsulation-triggering event in connection with the packet, wherein the encapsulation-triggering event comprises the expiration of the certain time interval while awaiting arrival of enough network packet data to satisfy the size threshold; and in response to detecting the encapsulation-triggering event:

encapsulates the packet; and forwards the packet via the start point of the encapsulation tunnel toward an end point of the encapsulation tunnel.

* * * * *